United States Patent
Lu et al.

(10) Patent No.: US 10,666,451 B2
(45) Date of Patent: May 26, 2020

(54) METHOD AND APPARATUS FOR CONTROLLING ACCESS OF HOUSEHOLD APPLIANCE DEVICE TO NETWORK

(71) Applicant: MIDEA GROUP CO., LTD., Foshan (CN)

(72) Inventors: Weishan Lu, Foshan (CN); Zhiyun Liu, Foshan (CN); Zhixiong Xian, Foshan (CN); Weimin Luo, Foshan (CN)

(*) Notice: Subject to any disclaimer, the term of this patent is extended or adjusted under 35 U.S.C. 154(b) by 38 days.

(21) Appl. No.: 16/034,379

(22) Filed: Jul. 13, 2018

(65) Prior Publication Data
US 2018/0323995 A1    Nov. 8, 2018

Related U.S. Application Data

(63) Continuation of application No. PCT/CN2016/073081, filed on Feb. 1, 2016.

(30) Foreign Application Priority Data

Jan. 14, 2016    (CN) .......................... 2016 1 0029461

(51) Int. Cl.
*H04L 12/28* (2006.01)
*H04W 48/10* (2009.01)
(Continued)

(52) U.S. Cl.
CPC ......... *H04L 12/2816* (2013.01); *H04W 48/10* (2013.01); *H04W 48/16* (2013.01); *H04W 76/11* (2018.02)

(58) Field of Classification Search
None
See application file for complete search history.

(56) References Cited

U.S. PATENT DOCUMENTS

2019/0230613 A1*  7/2019  Kim .................. H04W 8/005

FOREIGN PATENT DOCUMENTS

| CN | 103888908 A | 6/2014 |
|----|-------------|--------|
| CN | 103945369 A | 7/2014 |
| CN | 104581886 A | 4/2015 |

OTHER PUBLICATIONS

International Search Report dated Sep. 28, 2016 in the corresponding CN application (application No. PCT/CN2016/073081).
(Continued)

*Primary Examiner* — Ayaz R Sheikh
*Assistant Examiner* — Sori A Aga
(74) *Attorney, Agent, or Firm* — Kilpatrick Townsend & Stockton, LLP

(57) ABSTRACT

Disclosed are a method and apparatus for controlling the access of a household appliance device to a network. The method includes grouping network configuration information according to a grouping rule; generating a data block of each group, and the data block of each group contains a data packet corresponding to characters on each of information bits of a current group and a data packet corresponding to a serial number, and the length of the data packet corresponds to the characters on one information bit, or corresponds to the serial number, and sequentially broadcasting the data packet in each data block according to a grouping order. Moreover, the efficiency of the household appliance device accessing the network can be improved.

10 Claims, 6 Drawing Sheets

(51) Int. Cl.
*H04W 48/16* (2009.01)
*H04W 76/11* (2018.01)

(56) References Cited

OTHER PUBLICATIONS

First Office Action dated Oct. 10, 2016 in the corresponding CN application (application No. 201610029461.0).

* cited by examiner

METHOD AND APPARATUS FOR CONTROLLING ACCESS OF HOUSEHOLD APPLIANCE DEVICE TO NETWORK

CROSS-REFERENCE TO RELATED APPLICATIONS

This application is a continuation of International Application PCT/CN2016/073081, filed Feb. 1, 2016, which claims a priority to Chinese Patent Application Serial No. 201610029461.0, filed with the State Intellectual Property Office of P. R. China on Jan. 14, 2016, titled with "Method and Device for Controlling Household appliance to Access Network", the entire content of which is incorporated herein by reference.

FIELD

The present disclosure relates to the field of communication technology, and more particularly to a method and device for controlling a household appliance to access a network.

BACKGROUND

With the development of science and technology and the progress of society, a standard of people's daily life is improving and more and more network-based household appliances are springing up. The network-based household appliance is a new type of household appliances improved by applying a digital technology, a network technology and an intelligent control technology to a common household appliance. An in-house network may be established when the network-based household appliances communicate with each other. Meanwhile, the in-house network can also communicate with an external network.

Generally, before accessing the in-house network, the household appliance needs to acquire network configuration information of the in-house network, such as a name and a password of the in-house network. A general process of acquiring the network configuration information by the household appliance may be as follows. A mobile terminal acquires the network configuration information from a wireless router device. Afterwards, wireless network connection is established between the mobile terminal and the household appliance. With the wireless network connection, the mobile terminal sends the network configuration information to the household appliance, and the household appliance accesses the wireless router device according to the network configuration information, such that the household appliance accesses the in-house network.

A related data transmission manner is to send the network configuration information as a whole. After receiving a data packet, the household appliance parses the data packet to acquire the network configuration information. However, due to some network environment factors, such as unstable network environment, it is prone to cause data loss. Once the network configuration information is transmitted wrongly by one bit during transmission, the household appliance may not correctly identify the network configuration information. The mobile terminal needs to send the network configuration information again, so that the household appliance takes relative long time to acquire the network configuration information, thereby adversely influencing efficiency of the household appliance accessing the network.

SUMMARY

Embodiments of the present disclosure seek to solve at least one of the problems existing in the related art to at least some extent. Accordingly, one embodiment of the present disclosure is to provide a method for controlling a household appliance to access a network. In this method, a mobile terminal sends the network configuration information to the household appliance in a grouping manner, such that efficiency of the household appliance acquiring the network configuration information accurately can be improved, thereby improving efficiency of the household appliance accessing the network.

Another embodiment of the present disclosure is to provide another method for controlling a household appliance to access a network.

Yet another embodiment of the present disclosure is to provide a device for controlling a household appliance to access a network.

A further embodiment of the present disclosure is to provide another device for controlling a household appliance to access a network.

Embodiments of a first aspect of the present disclosure provide a method for controlling a household appliance to access a network. The method includes: grouping network configuration information according to a grouping rule; generating a data block for each group, in which the data block for each group includes a first data packet corresponding to a character for each information bit in a current group and a second data packet corresponding to a series number for the current group, and a length of the first data packet corresponds to the character for each information bit in the current group, and a length of the second data packet corresponds to the series number for the current group; and broadcasting data packets in order in each data block according to a grouping order, so that the household appliance acquires the network configuration information according to the data packets received and accesses the network through the network configuration information.

With the method for controlling the household appliance to access the network according to embodiments of the present disclosure, the network configuration information is grouped according to the grouping rule; the data block is generated for each group; the data packets in each data block are broadcasted in order according to the grouping order, so that the household appliance acquires the network configuration information according to the data packets received and accesses the network through the network configuration information. Therefore, the network configuration information is sent to the household appliance in the grouping manner, such that efficiency of the household appliance acquiring the network configuration information accurately can be improved, thereby improving efficiency of the household appliance accessing the network.

In addition, the method for controlling the household appliance to access the network provided in embodiments of the present disclosure may further have any one of the following additional technical features.

According to an embodiment of the present disclosure, the information bit is an information bit of a network identifier SSID or an information bit of a password for accessing the network.

According to an embodiment of the present disclosure, generating a data block for each group includes: determining the length of the first data packet corresponding to the character for each information bit in the current group according to a pre-stored correspondence between a length and a character, and generating the first data packet with the length determined; assigning a unique series number to the current group and generating the second data packet with the length corresponding to the series number; and generating the data block for the current group according to the first data packet corresponding to the character and the second data packet corresponding to the series number.

According to an embodiment of the present disclosure, the data block for each group consists of a preamble field, a length field, a grouping series number field, a content field and a verification field, in which the preamble field is configured to store specific information, in which the specific information is pre-arranged between a mobile terminal and the household appliance such that the household appliance locks onto a communication channel through the specific information; the length field is configured to store a length of a network identifier SSID or a length of a password for accessing the network; the grouping series number field is configured to store a grouping series number; the content field is configured to store the character for each information bit in each group; and the verification field is configured to store a verification value, in which the verification value is generated according to a content of the length field, a content of the grouping series number field and a content of the content field.

According to an embodiment of the present disclosure, the method further includes: determining a length of the network configuration information, in which generating the data block for each group includes: generating a data packet corresponding to the specific information; generating a data packet corresponding to the length of the network configuration information; generating a verification value of the current group according to the character for each information bit in the current group, the length of the network configuration information and the series number for the current group, and generating a data packet corresponding to the verification value; and generating the data block for the current group according to the data packet corresponding to the specific information, the data packet corresponding to the length of the network configuration information, the data packet corresponding to the series number, the data packet corresponding to the character for each information bit in the current group and the data packet corresponding to the verification value.

According to an embodiment of the present disclosure, the data block further includes a data packet indicating whether the current group is the network identifier SSID or the password for accessing the network.

According to an embodiment of the present disclosure, the method further includes: receiving a confirmation instruction sent by the household appliance, and stopping sending data packets to the household appliance according to the confirmation instruction.

Embodiments of a second aspect of the present disclosure provide a method for controlling a household appliance to access a network. The method includes: receiving a sequence of data packets sent by a mobile terminal; analyzing the sequence of data packets received to determine each data block according to the sequence of data packets received when determining that the sequence of data packets received includes network configuration information, in which each of the data blocks includes a part content of the network configuration information, and each of the data blocks has an individual series number; receiving the sequence of data packets sent by the mobile terminal continuously when monitoring that there is an incorrect data block having an incorrect content in the sequence of data packets received, and generating the network configuration information according to an order of the series numbers and contents of correct data blocks when determining that all of the data blocks are the correct data blocks each having a correct content according to received results; and accessing a router device based on the network configuration information.

With the method for controlling the household appliance to access the network according to embodiments of the present disclosure, the sequence of data packets sent by the mobile terminal is received; the sequence of data packets received is analyzed to determine each data block according to the sequence of data packets received when it is determined that the sequence of data packets received includes the network configuration information; the sequence of data packets sent by the mobile terminal is received continuously when it is monitored that there is an incorrect data block having an incorrect content in the sequence of the data packets received, and the network configuration information is generated according to the order of the series numbers and contents of correct data blocks when it is determined that all of the data blocks are the correct data blocks each having a correct content according to the received results, such that efficiency of the household appliance acquiring the network configuration information accurately can be improved, thereby improving efficiency of the household appliance accessing the network.

In addition, the method for controlling the household appliance to access the network provided in embodiments of the present disclosure may further have any one of the following additional technical features.

According to an embodiment of the present disclosure, determining that the sequence of data packets received includes network configuration information includes: judging whether the sequence of data packets received includes data packets satisfying a preset condition; if yes, determining that the sequence of data packets received includes the network configuration information.

According to an embodiment of the present disclosure, when determining that all of the data blocks are correct and each data block has a correct content according to received results, the method further includes: sending a confirmation instruction to the mobile terminal, so that the mobile terminal stops sending data packets to the household appliance according to the confirmation instruction.

Embodiments of a third aspect of the present disclosure provide a device for controlling a household appliance to access a network. The device includes: a grouping device, configured to group network configuration information according to a grouping rule; a generating device, configured to generate a data block for each group, in which the data block for each group includes a first data packet corresponding to a character for each information bit in a current group and a second data packet corresponding to a series number for the current group, a length of the first data packet corresponds to the character for each information bit in the current group and a length of the second data packet corresponds to the series number for the current group; and a broadcasting device, configured to broadcast data packets in order in each data block according to a grouping order, so that the household appliance acquires the network configuration information according to the data packets received and accesses the network through the network configuration information.

With the device for controlling the household appliance to access the network according to embodiments of the present disclosure, the grouping device groups the network configuration information according to the grouping rule; the generating device generates the data block for each group; the broadcasting device broadcasts the data packets in order in each data block according to the grouping order, so that the household appliance acquires the network configuration information according to the data packets received and accesses the network according to the network configuration information. Therefore, the network configuration information is sent to the household appliance in the grouping manner, such that efficiency of the household appliance acquiring the network configuration information accurately can be improved, thereby improving efficiency of the household appliance accessing the network.

In addition, the device for controlling the household appliance to access the network provided in embodiments of the present disclosure may further have any one of the following additional technical features.

According to an embodiment of the present disclosure, the information bit is an information bit of a network identifier SSID or an information bit of a password for accessing the network.

According to an embodiment of the present disclosure, the generating device is configured to: determine the length of the first data packet corresponding to the character for each information bit in the current group according to a pre-stored correspondence between a length and a character, and generate the first data packet with the length determined; assign a unique series number to the current group and generate the second data packet with the length corresponding to the series number; and generate the data block for the current group according to the first data packet corresponding to the character and the second data packet corresponding to the series number.

According to an embodiment of the present disclosure, the data block for each group consists of a preamble field, a length field, a grouping series number field, a content field and a verification field, in which the preamble field is configured to store specific information, in which the specific information is pre-arranged between a mobile terminal and the household appliance such that the household appliance locks onto a communication channel through the specific information; the length field is configured to store a length of a network identifier SSID or a length of a password for accessing the network; the grouping series number field is configured to store a grouping series number; the content field is configured to store the character for each information bit in each group; and the verification field is configured to store a verification value, in which the verification value is generated according to a content of the length field, a content of the grouping number field and a content of the content field.

According to an embodiment of the present disclosure, the device further includes a determining device, configured to determine a length of the network configuration information, and the generating device is configured to generate a data packet corresponding to the specific information; to generate a data packet corresponding to the length of the network configuration information; to generate a verification value of the current group according to the character for each information bit in the current group, the length of the network configuration information and the series number for the current group, and to generate a data packet corresponding to the verification value; and to generate the data block for the current group according to the data packet corresponding to the specific information, the data packet corresponding to the length of the network configuration information, the data packet corresponding to the series number, the data packet corresponding to the character for each information bit in the current group and the data packet corresponding to the verification value.

According to an embodiment of the present disclosure, the data block further includes a data packet indicating whether the current group is the network identifier SSID or the password for accessing the network.

According to an embodiment of the present disclosure, the device further includes a processing device, configured to receive a confirmation instruction and to stop sending data packets to the household appliance according to the confirmation instruction.

Embodiments of a fourth aspect of the present disclosure provide a device for controlling a household appliance to access a network. The device includes: a receiving device, configured to receive a sequence of data packets sent by a mobile terminal; an analyzing device, configured to analyze the sequence of data packets received to determine each data block according to the sequence of data packets received when it is determined that the sequence of data packets received includes network configuration information, in which each of the data blocks includes a part content of the network configuration information, and each of the data packets has an individual number; a processing device, configured to receive the sequence of data packets sent by the mobile terminal continuously when it is monitored that there is an incorrect data block having an incorrect content in the sequence of data packets received, and to generate the network configuration information according to an order of the series numbers and contents of correct data blocks when it is determined that all of the data blocks are the correct data blocks each having a correct content according to received results; and an accessing device, configured to access a router device based on the network configuration information.

With the device for controlling the household appliance to access the network according to embodiments of the present disclosure, the receiving device receives the sequence of data packets sent by the mobile terminal; the analyzing device analyzes the sequence of data packets received to determine each data block according to the sequence of data packets received when it is determined that the sequence of data packets received includes the network configuration information; and the processing device receives the sequence of data packets sent by the mobile terminal continuously when it is monitored that there is an incorrect data block having an incorrect content in the sequence of data packets received, and generates the network configuration information according to the order of the series numbers and contents of correct data blocks when it is determined that all data blocks are the correct data blocks each having a correct content according to received results, such that efficiency of the household appliance acquiring the network configuration information accurately can be improved, thereby improving efficiency of the household appliance accessing the network.

In addition, the device for controlling the household appliance to access the network provided in embodiments of the present disclosure may further have any one of the following additional technical features.

According to an embodiment of the present disclosure, the analyzing device is configured to judge whether the sequence of data packets received includes data packets satisfying a preset condition; if yes, to determine that the sequence of data packets received includes the network configuration information.

According to an embodiment of the present disclosure, the device further includes: a sending device, configured, when it is determined that all of the data blocks are correct and each data block has a correct content according to received results, to send a confirmation instruction to the mobile terminal, so that the mobile terminal stops sending data packets to the household appliance according to the confirmation instruction.

BRIEF DESCRIPTION OF THE DRAWINGS

Embodiments of the present disclosure will become apparent and more readily appreciated from the following descriptions made with reference to the drawings.

DETAILED DESCRIPTION

Figure 1:
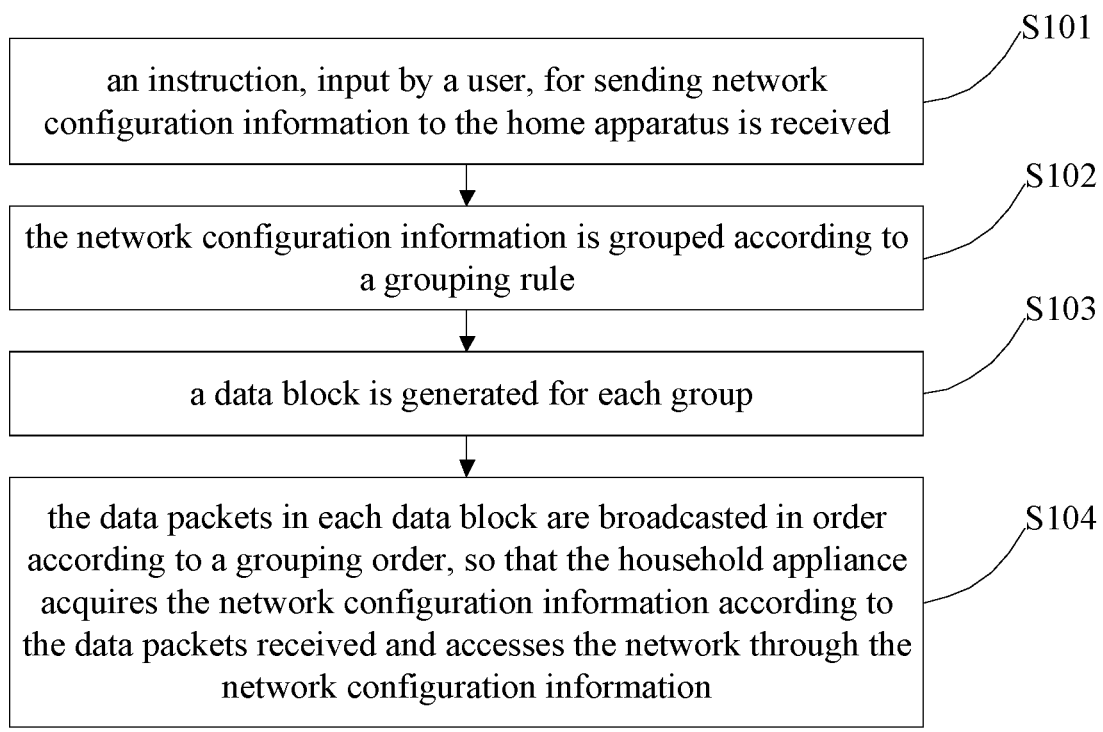
FIG. 1 is a flow chart showing a method for controlling a household appliance to access a network according to an embodiment of the present disclosure.

Descriptions will be made in detail to embodiments of the present disclosure, examples of the embodiments are shown in drawings, in which the same or similar elements and the elements having same or similar functions are denoted by like reference numerals throughout the descriptions. The embodiments described herein with reference to drawings are explanatory, are intended to understand the present disclosure, and are not construed to limit the present disclosure.

The method and device for controlling a household appliance to access a network in embodiments of the present disclosure will be described with reference to drawings.

FIG. 1 is a flow chart showing a method for controlling a household appliance to access a network according to an embodiment of the present disclosure.

As illustrated in FIG. 1, the method for controlling the household appliance to access the network includes the followings.

At block 101, an instruction, input by a user, for sending network configuration information to the household appliance is received.

The household appliance may be a smart television, a smart refrigerator, a smart washer or the like.

In an embodiment of the present disclosure, the network configuration information may be sent to the household appliance by a mobile terminal, such as a smart phone and a tablet computer.

In detail, the network configuration information may be sent to the household appliance through an application (APP) installed in the mobile terminal. After it is detected that an option, provided by the APP, which indicates to send the network configuration information to the household appliance is triggered by the user, the mobile terminal acquires the network configuration information.

The network configuration information includes a password for accessing the network and a network identifier, such as a Service Set Identifier (SSID). The network identifier SSID is for example a name of the network.

At block 102, the network configuration information is grouped according to a grouping rule.

In detail, after acquiring the network configuration information, the mobile terminal groups the network configuration information according to a grouping rule pre-stored.

It should be illustrated that, the grouping rule is pre-calibrated between the mobile terminal and the household appliance.

For example, the grouping rule pre-calibrated between the mobile terminal and the household appliance is to take four bytes as a group. When it is monitored that an interface indicating to send the SSID and the password for accessing the network is opened during the user using the mobile phone, a name of a current network the mobile terminal has accessed is added automatically to the interface. When it is monitored that the interface receives the password for accessing the network input by the user and an option to send is triggered by the user, the name of the current network is grouped according to the grouping rule. It is assumed that the name of the current network is "abcdefgh", then the name of the current network can be grouped into two groups, with "abcd" as a content of a first group and "efgh" as a content of a second group.

At block 103, a data block is generated for each group.

The data block for each group includes a first data packet corresponding to a character for each information bit in the current group and a second data packet corresponding to a series number for the current group. A length of the first data packet corresponds to the character for each information bit in the current group, and a length of the second data packet corresponds to the series number for the current group.

The information bit is an information bit of a network identifier SSID or an information bit of the password for accessing the network.

In detail, after the network configuration information is grouped, for each group, the length of the first data packet corresponding to the character for each information bit in the current group may be determined according to a pre-stored correspondence between a length and a character and thus the first data packet with the length determined is generated; a unique series number is assigned to the current group and the second data packet with the length corresponding to the series number is generated; and the data block for the current group is generated according to the first data packet corresponding to the character for each information bit in the current group and the second data packet corresponding to the series number for the current group.

For example, in the case that the name of the network is "abcdefgh", the name of the network is grouped into two groups according to the grouping rule, with "abcd" as the content of the first group and "efgh" as the content of the second group. It is assumed that the length of the first group is 12131415 by mapping the content of the first group according to the pre-stored correspondence between the length and the character, i.e., the length of the data packet corresponding to the character "a" is 12; the length of the data packet corresponding to the character "b" is 13; the length of the data packet corresponding to the character "c"

is 14; and the length of the data packet corresponding to the character "d" is 15. Similarly, it can be determined that the length of the second group is 16171819 according to the pre-stored correspondence between the length and the character. After the lengths of the data packets corresponding to contents of each group are determined, the data packets with individual lengths are generated to represent the character for each information bit.

In an embodiment of the present disclosure, in order to enable the household appliance to distinguish the network identifier SSID from the password for accessing the network, a pre-arrangement can be made between the mobile terminal and the household appliance that a grouping series number of the data block containing the network identifier SSID is in a different range interval as compared with a grouping series number of the data block containing the password for accessing the network.

For example, it can be pre-arranged between the mobile terminal and the household appliance that, a range interval of the grouping series number of the data block containing the network identifier SSID is from 1 to 20, and a range interval of the grouping series number of the data block containing the password for accessing the network is from 21 to 40. It is assumed that a grouping rule is to take 4 bytes as a group, the network identifier SSID is "abcdefghij", and the password for accessing the network is "abcd1234"; the network identifier SSID is grouped into three groups, in which the content of the first group is "abcd" and the series number for the first group is 1; the content of the second group is "efgh" and the series number for the second group is 2; and the content of the third group is "ij" and the series number for the third group is 3; while the password for accessing the network can be grouped into two groups, in which the content of the first group is "abcd" and the series number for the first group is 21; and the content of the second group is "1234" and the series number for the second group is 22, such that the household appliance can distinguish, by parsing a sequence of data packets received, the type of each data block, the network identifier SSID or the password for accessing the network, after receiving the sequence of data packets.

In another embodiment of the present disclosure, in order to distinguish whether the data block transmits the network identifier SSID or the password for accessing the network, an additional data packet may be added to the data block for each group, indicating whether the data block of the current group is the network identifier SSID or the password for accessing the network.

For example, it may be pre-arranged between the mobile terminal and the household appliance that 0 corresponds to the network identifier SSID, and 1 corresponds to the password for accessing the network. It is assumed that the network identifier SSID is grouped into two groups, and the password for accessing the network is grouped into three groups, then a data packet with a length of 0 is added to each of the data blocks of the first group and the second group when generated, and a data packet with a length of 1 is added to each of the data blocks of the third group, the fourth group and the fifth group when generated, such that after the mobile terminal sends the data packets in order in each data block to the household appliance, the household appliance can distinguish, by parsing a sequence of data packets received, that five data blocks are transmitted, with the contents in the data blocks of the first group and the second group corresponding to the network identifier SSID and the contents in the data blocks of the third group, the fourth group and the fifth group corresponding to the password for accessing the network, thereby generating the network identifier SSID according to stitching algorithm with the contents in the data blocks of the first group and the second group, generating the password for accessing the network according to stitching algorithm with the contents in the data blocks of the third group, the fourth group and the fifth group, and thus accessing the network according to the network identifier SSID and the password for accessing the network obtained.

In an embodiment, the data block may consist of a preamble field, a length field, a grouping series number field, a content field, and a verification field. It should be understood that, a format of the data block of each group may be illustrated as Table 1.

| preamble field | length field | grouping series number field | content field | verification field |
|---|---|---|---|---|

The preamble field in Table 1 is configured to store specific information. The specific information is pre-arranged between the mobile terminal and the household appliance, so that the household appliance locks onto a communication channel through the specific information.

Generally, the mobile terminal, such as a mobile phone, communicates with a router device via a certain channel. However, the household appliance may not get the communication channel between the mobile terminal and the router device. As a result, the household appliance will poll each channel to find a synchronization header (i.e. the preamble field) pre-arranged with the mobile terminal, so as to lock onto the channel and thus receive the data packets broadcasted by the mobile terminal via the channel.

Further, each the data block of each group includes the preamble field. The household appliance may distinguish different data blocks according to the preamble field. That is to say, the preamble field is a starting flag for each data block of each group.

The length field in Table 1 is configured to store the length of the network identifier SSID or the length of the password for accessing the network.

For example, if the length of the network identifier SSID is 8 bytes, then the content of the length field is 8.

The grouping series number field is configured to store the series number for each group.

The content field is configured to store the character for each information bit in each group.

The verification field is configured to store a verification value. The verification value is generated according to a content of the length field, a content of the grouping series number field and a content of the content field.

In detail, after the network configuration information is acquired, the length of the network configuration information can be determined. It should be understood that, when the network configuration information includes both the network identifier SSID and the password for accessing the network, the length of the network identifier SSID and the length of the password for accessing the network can be determined respectively.

It should be illustrated that, the data block is in a format pre-arranged between the mobile terminal and the household appliance.

In detail, the data block of the current group is generated as follows: generating a data packet corresponding to the specific information; generating a data packet corresponding to the length of the network configuration information; generating a verification value of the current group according to the character for each information bit in the current group, the length of the network configuration information and the series number for the current group; generating a data packet corresponding to the verification value; and generating the data block of the current group according to the data packet corresponding to the specific information, the data packet corresponding to the length of the network configuration information, the data packet corresponding to the series number, the data packet corresponding to the character for each information bit in the current group and the data packet corresponding to the verification value.

At block 104, the data packets in each data block are broadcasted in order according to a grouping order, so that the household appliance acquires the network configuration information according to the data packets received and accesses the network according to the network configuration information.

For example, it is assumed that the specific information pre-arranged between the mobile terminal and the household appliance is 1234; the data block transmitted between the mobile terminal and the household appliance is in the format as illustrated in Table 1; the network identifier SSID has a length of 10 bytes; after the network identifier SSID is grouped, the content of the first group is "abcd", the series number for the first group is 1, the length of the first group determined according to the correspondence between the character and the length is "12 13 14 15", the verification value of the first group generated according to the length of the network identifier SSID, and the series number for the first group and the content of the first group "abcd" is 29; a data packet A with a length of 1, a data packet B with a length of 2, a data packet C with a length of 3 and a data packet D with a length of 4 are generated according to the specific information; a data packet E with a length of 10 is generated according to the length of the network identifier SSID; a data packet F with a length of 1 is generated according to the series number for the first group; a data packet G with a length of 12, a data packet H with a length of 13, a data packet I with a length of 14 and a data packet J with a length of 15 are generated according to the length of the first group; and a data packet K with a length of 29 is generated according to the verification value, then these data packets are sent in order according to the format of the data block as shown in Table 1, i.e., the mobile terminal may send the data packets of the first group in the order as: the data packet A→the data packet B→the data packet C→the data packet D→the data packet E→the data packet F→the data packet G→the data packet H→the data packet I→the data packet J. Accordingly, the first four data packets received by the household appliance may have a changed length because the mobile terminal may encrypt these data packets during broadcasting, however such a changed length between a length of an unencrypted data packet and a length of an encrypted data packet is constant. If receiving the first four data packets with individual lengths of 11, 12, 13 and 14, the household appliance can identify that the lengths of the first four data packets are characterized by an arithmetic progression with a difference of 1, thereby determining that the data packets transmitted by the mobile terminal are of individual actual lengths of 1, 2, 3 and 4, which are added a constant value of 10 during broadcasted by the mobile terminal for encryption. As such, it can be determined that the first four data packets satisfy the preset condition, then the household appliance locks onto a communication channel to receive a sequence of data packets sent by the mobile terminal subsequently and processes data packets after the constant value of 10 is subtracted from the length of each data packet.

It would be understood that, for the network configuration information having a length of N bytes, if the network configuration information is grouped into M groups, at least N/M bytes are transmitted for each group. The format of the data block of each group is shown as Table 1. Each data block includes data packets. That is, the mobile terminal needs to send M data blocks, and the format of each data block is illustrated as Table 1.

With the method for controlling the household appliance to access the network according to embodiments of the present disclosure, the network configuration information is grouped according to the grouping rule; the data block is generated for each group; the data packets in each data block are broadcasted in order according to the grouping order, so that the household appliance acquires the network configuration information according to the data packets received and accesses the network according to the network configuration information. Therefore, the network configuration information is sent to the household appliance in the grouping manner, such that efficiency of the household appliance acquiring the network configuration information accurately can be improved, thereby improving efficiency of the household appliance accessing the network.

Figure 2:
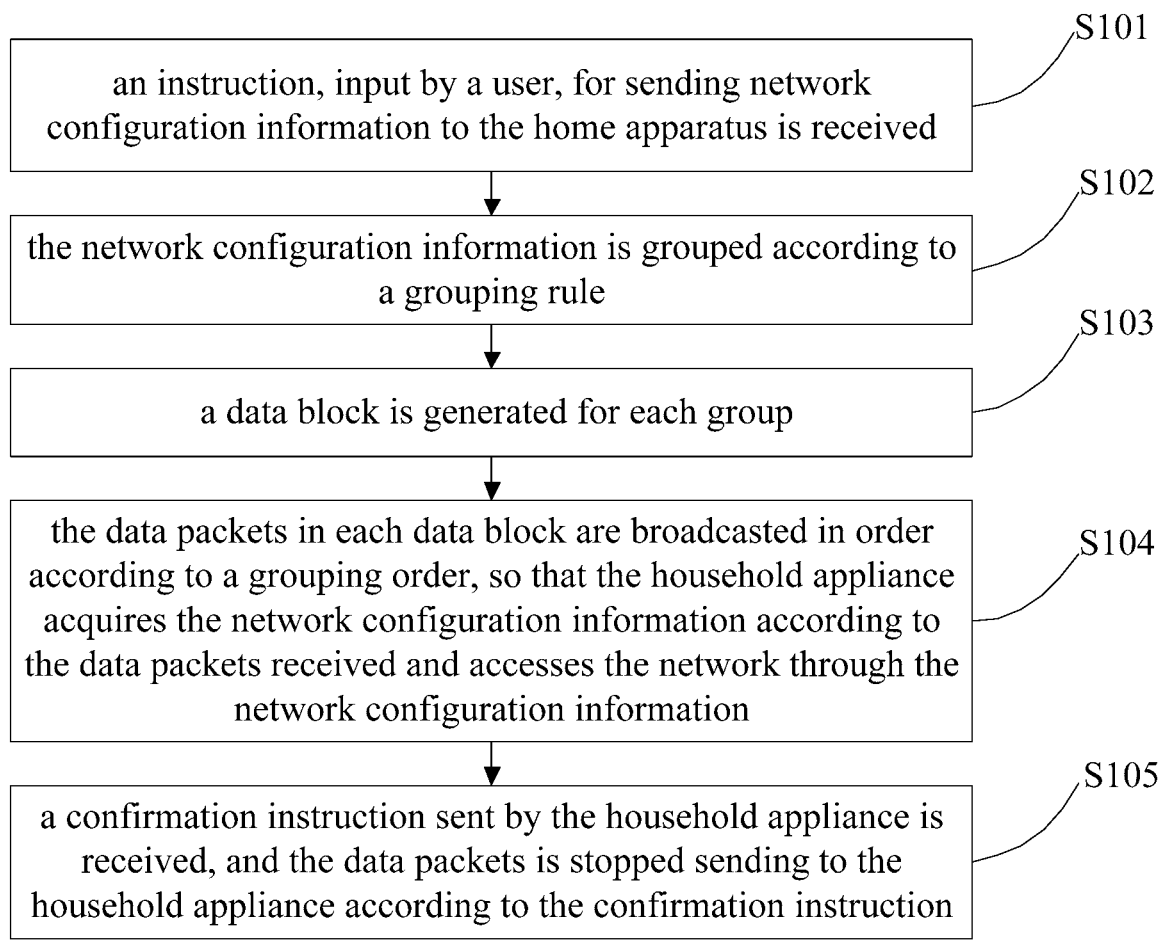
FIG. 2 is a flow chart showing a method for controlling a household appliance to access a network according to another embodiment of the present disclosure.

On the basis of the above embodiment, as illustrated in FIG. 2, the method may further include a block 105.

At block 105, a confirmation instruction sent by the household appliance is received, and the data packets is stopped sending to the household appliance according to the confirmation instruction.

In order to avoid the mobile terminal from sending the data packet to the household appliance continuously after the household appliance accesses the network successfully, the household appliance sends the confirmation instruction to the mobile terminal after acquiring the network configuration information successfully. The mobile terminal is controlled to stop sending the data packets including the network configuration information to the household appliance, after receiving the conformation instruction.

Figures 3, 4:
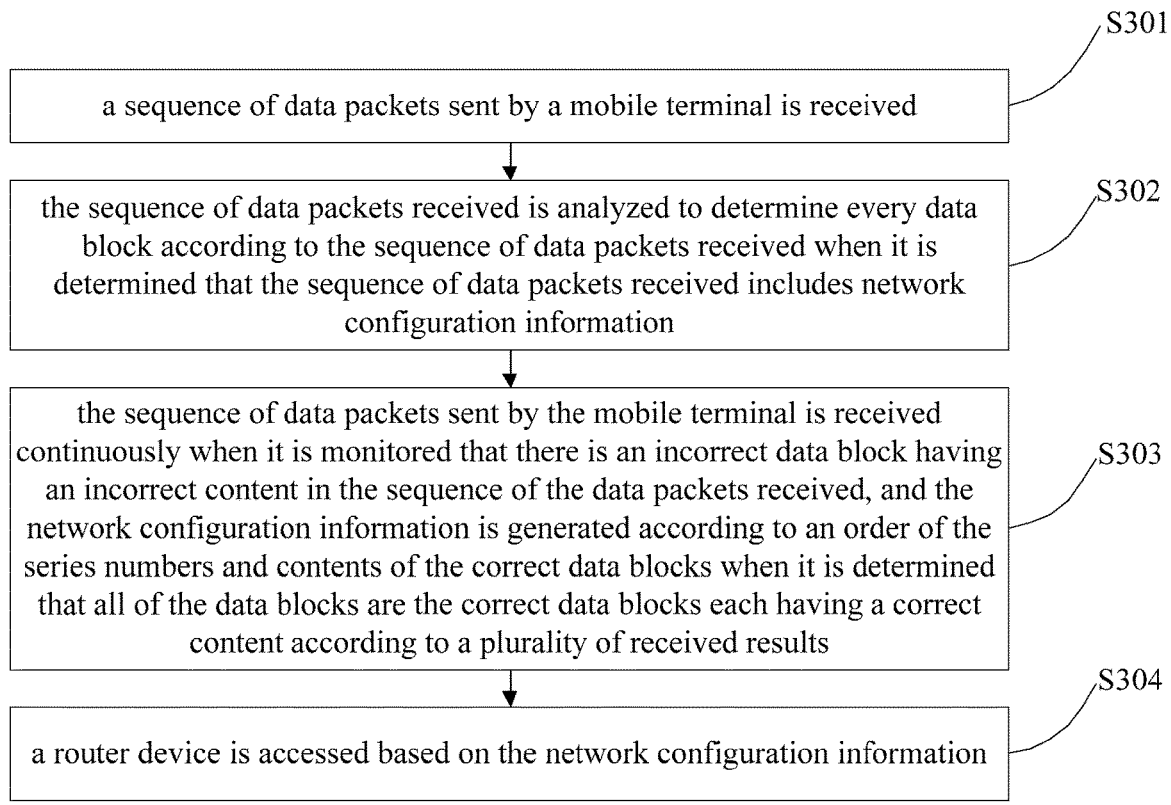
FIG. 3 is a flow chart showing a method for controlling a household appliance to access a network according to still another embodiment of the present disclosure.
FIG. 4 is a schematic diagram illustrating two transmitting results.

FIG. 3 is a flow chart showing a method for controlling a household appliance to access a network according to another embodiment of the present disclosure. Embodiment of FIG. 3 describes the method from an aspect of the household appliance. As illustrated in FIG. 3, the method for controlling a household appliance to access a network may include the followings.

At block 301, a sequence of data packets sent by a mobile terminal is received.

At block 302, the sequence of data packets received is analyzed to determine each data block according to the sequence of data packets received when it is determined that the sequence of data packets received includes network configuration information.

Each data block includes a part content of the network configuration information, and each of the data blocks has an individual series number.

The network configuration information includes a password for accessing the network, and a network identifier SSID. The network identifier SSID is for example a name of the network.

In detail, during receiving the sequence of data packets sent by the mobile terminal, the household appliance may judge whether the sequence of data packets received includes data packets satisfying a preset condition. If the sequence of data packets received includes the data packets satisfying the preset condition, it is determined that the sequence of data packets includes the network configuration information.

The preset condition is pre-set by the household appliance.

For example, the preset condition is that if a difference between lengths of each two adjacent data packets in the first four data packets received is 1, it can be determined that the sequence of data packets sent by the mobile terminal includes the network configuration information. As such, the household appliance locks onto the communication channel and continuously receives the data packet sent by the mobile terminal subsequently.

It should be understood that, the format of the data block arranged between the household appliance and the data block is illustrated as Table 1. It may also be understood that Table 1 is a protocol used in transmission between the household appliance and the mobile terminal. For those fields included in Table 1, descriptions may be referred to above embodiments, which are not elaborated herein.

In an embodiment of the present disclosure, a pre-arrangement made between the household appliance and the mobile terminal is to send the data packets with individual lengths of 1, 2, 3 and 4. If receiving the first four data packets with individual lengths characterized by an arithmetic progression with a difference of 1, the household appliance can determine that the sequence of data packets sent by the mobile terminal subsequently includes the network configuration information, and then lock onto a communication channel to continuously receive the sequence of data packets sent by the mobile terminal.

For example, the specific information pre-arranged between the mobile terminal and the household appliance is 1, 2, 3 and 4, that is, the mobile terminal sends the data packets with individual lengths of 1, 2, 3 and 4. Generally, the mobile terminal will encrypt the data packets during broadcasting, resulting in a constant difference value between a length of an unencrypted data packet and a length of an encrypted data packet. If receiving the first four data packets with the individual lengths of 11, 12, 13 and 14, the household appliance can identify that the lengths of the first four data packets are characterized by an arithmetic progression with a difference of 1, thereby determining that the data packets transmitted by the mobile terminal are of individual actual lengths of 1, 2, 3 and 4, which are added a constant value of 10 during broadcasted by the mobile terminal for encryption. Afterwards, the household appliance locks onto a communication channel to receive a sequence of data packets sent by the mobile terminal subsequently, and processes data packets after the constant value of 10 is subtracted from the length of each data packet. It is assumed that four data packets with individual lengths of 25, 26, 27 and 28 are received corresponding to the content field of the data block, the constant value of 10 is subtracted from the length of each data packet, before a character is determined according to the pre-stored correspondence between the character and the length, that is, the character is determined according to said correspondence with the individual actual lengths of 15, 16, 17 and 18. If the mobile terminal receives the data packets with the individual lengths of 11, 12, 13 and 14 again, it indicates that the former data block is transmitted completely and a next data block starts to be received now. That is, the preamble field is the starting flag for each group.

At block 303, the sequence of data packets sent by the mobile terminal is received continuously when it is monitored that there is an incorrect data block having an incorrect content in the sequence of the data packets received, and the network configuration information is generated according to an order of the series numbers and contents of correct data blocks when it is determined that all of the data blocks are the correct data blocks each having a correct content according to received results.

At block 304, a router device is accessed based on the network configuration information.

For example, the network configuration information is grouped into n groups, i.e., the household appliance will receive n data blocks. It is assumed that the mobile terminal transmits the data packets including the network configuration information to the household appliance by two times, the household appliance receives a first transmitted result and a second transmitted result as illustrated in FIG. 4. According to the first transmitted result and the second transmitted result, it can be determined that the content of each data block is correct. As such, the network configuration information can be thus generated according to the order of the series numbers for the data blocks and the contents of all correct data blocks. Afterwards, the household appliance sends the network configuration information to the router device so as to access the network through the network configuration information.

For making embodiments of the present disclosure to be simply understood, a specific example is shown to describe the method for controlling the household appliance to access the network.

For example, it can be pre-arranged between the mobile terminal and the household appliance that, a range interval of the grouping series number of the data block containing the network identifier SSID is from 1 to 20, and a range interval of the grouping series number of the data block containing the password for accessing the network is from 21 to 40. It is assumed that a grouping rule is to take four bytes as a group; the network identifier SSID is "abcdefgh" and the password for accessing the network is "abcd1234"; the network identifier SSID is grouped into two groups, in which the content of the first group is "abcd", and the series number for the first group is 1; and the content of the second group is "efgh" and the series number for the second group is 2; while the password for accessing the network is group into two groups, in which the content of the first group is "abcd" and the series number for the first group is 21; and the content of the second group is "1234" and the series number for the second group is 22.

It is assumed that the specific information pre-arranged between the household appliance and the mobile terminal is 1, 2, 3 and 4, that is, the mobile terminal sends the data packets with the individual lengths of 1, 2, 3 and 4. If receiving the data packets with the individual lengths of 11, 12, 13 and 14, the household appliance can analyze that the lengths of the first four data packets are characterized by an arithmetic progression with a difference of 1, thereby determining that the data packets transmitted by the mobile terminal are of individual actual lengths of 1, 2, 3 and 4, which are added a constant value of 10 during broadcasted by the mobile terminal for encryption. As such, the household appliance locks onto a communication channel, and receives the sequence of data packets sent by the mobile terminal subsequently. If the household appliance determines by analyzing the data packets received in accordance with the format of the data block that four data blocks are received in total (i.e., it should be understood that each data block represents one group) after broadcasting by the mobile terminal is completed, specific analyzing results for these four data blocks are as follows: the series number for the data block of the first group is 1, the content of the data block of the first group is determined to be correct according to the verification field, and the content of the content field of the data block is "abcd"; the series number for the data block of the second group is 2, the content of the data block of the second group is determined to be incorrect according to the verification field, and the content of the content field of the data block is "efgl"; the series number for the data block of the third group is 21, the content of the data block the third group is determined to be correct according to the verification field, and the content of the content field of the data block is "abcd"; and the series number for the data block of the fourth group is 22, the content of the data block of the fourth group is determined to be correct according to the verification field, and the content of the content field of the data block is "1234". Based on analysis of the series numbers for the four data blocks, it can be determined that the contents of the first two groups are related to the content of the network identifier SSID, and the contents of the latter two groups are related to the content of the accessing password.

Since the content of the data block of the second group is incorrect in the current received result for the first time, the household appliance further receives the sequence of data packets broadcasted by the mobile terminal continuously. If a received result for the second time is that: the content of the data block of the first group is correct, the content of the data block of the second group is correct, the content of the data block of the third group is incorrect and the content of the data block of the fourth group is correct, then it can be determined that the contents of the four groups are correct according to these two received results. As such, all correct data blocks may be determined according to these two received results, based on which the network identifier SSID and the password for accessing the network can be determined. Afterwards, the household appliance can access the network through the network identifier SSID and the password for accessing the network.

It should be illustrated that, the above explanations and descriptions to the method for controlling the household appliance to access the network are also suitable for the method in the embodiments described here, which are not elaborated.

With the method for controlling the household appliance to access the network according to embodiments of the present disclosure, the sequence of data packets sent by the mobile terminal is received; the sequence of data packets received is analyzed to determine each data block according to the sequence of data packets received when it is determined that the sequence of data packets received includes the network configuration information; the sequence of data packets sent by the mobile terminal is received continuously when it is monitored that there is an incorrect data block having an incorrect content in the sequence of the data packets, and the network configuration information is generated according to the order of the series numbers and contents of correct data packets when it is determined that all of the data blocks are the correct data blocks each having a correct content according to the received results, such that efficiency of the household appliance acquiring the network configuration information accurately can be improved, thereby improving efficiency of the household appliance accessing the network.

Figure 5:
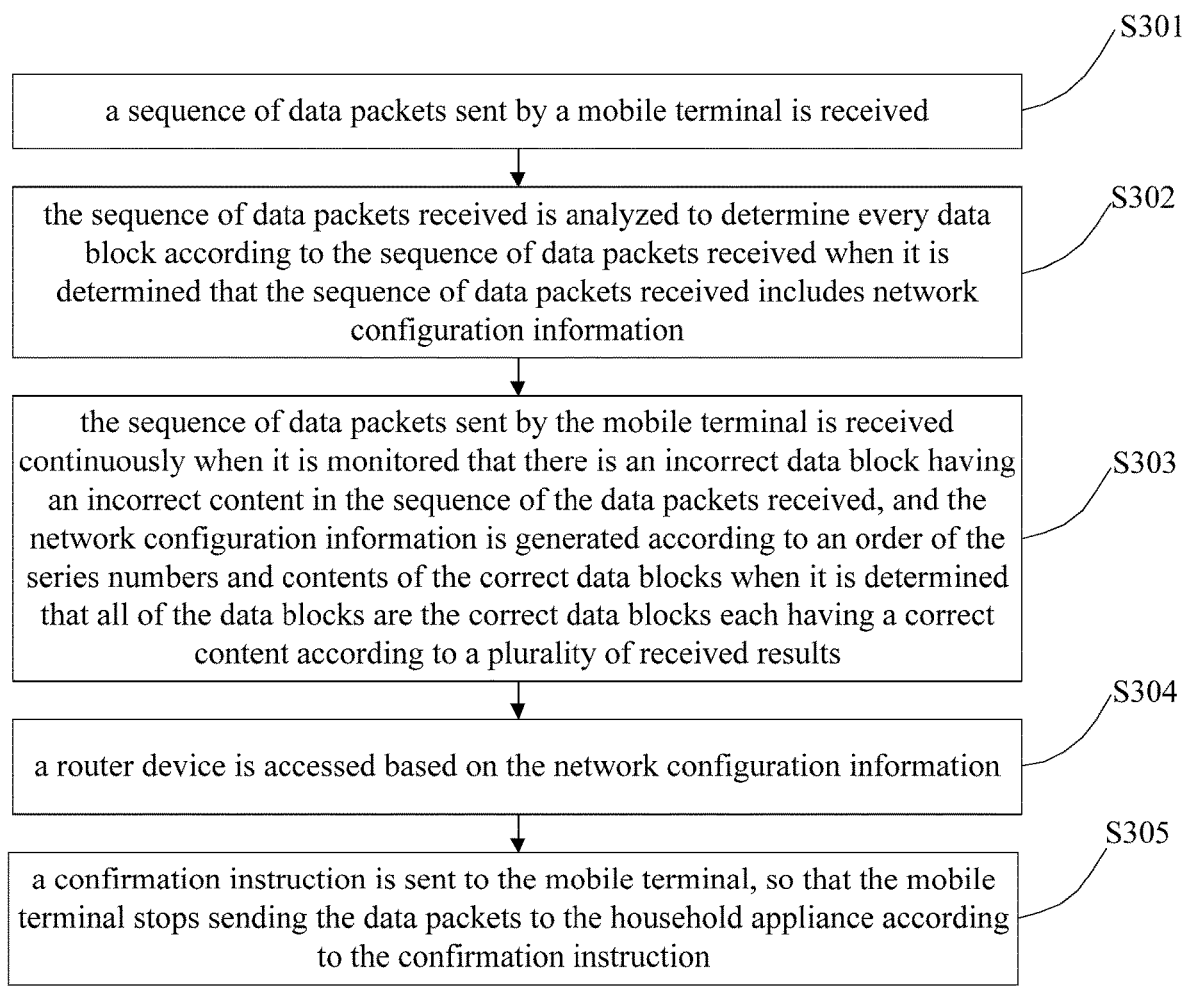
FIG. 5 is a flow chart showing a method for controlling a household appliance to access a network according to yet another embodiment of the present disclosure.

On the basis of the above embodiment, as illustrated in FIG. 5, the method may further include a block 305.

At block 305, a confirmation instruction is sent to the mobile terminal, so that the mobile terminal stops sending the data packets to the household appliance according to the confirmation instruction.

In order to avoid the mobile terminal from sending the data packet to the household appliance continuously after the household appliance accesses the network successfully, the household appliance sends the confirmation instruction to the mobile terminal after acquiring the network configuration information successfully. The mobile terminal is controlled to stop sending the data packets including the network configuration information to the household appliance, after receiving the conformation instruction.

Figure 6:
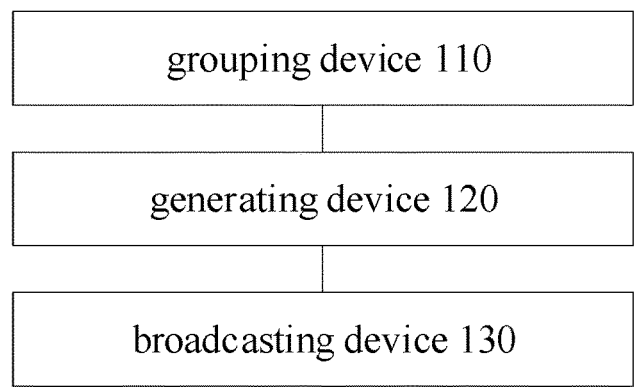
FIG. 6 is a block diagram of a device for controlling a household appliance to access a network according to an embodiment of the present disclosure.

FIG. 6 is a block diagram of a device for controlling a household appliance to access a network according to an embodiment of the present disclosure.

As illustrated in FIG. 6, the device for controlling the household appliance to access the network is provided in a mobile terminal. The device for controlling the household appliance to access the network includes a grouping device 110, a generating device 120 and a broadcasting device 130.

Specifically, the grouping device 110 is configured to group network configuration information according to a grouping rule.

The network configuration information includes a password for accessing the network and a network identifier, such as a Service Set Identifier (SSID). The network identifier SSID is for example a name of the network.

In detail, after acquiring the network configuration information, the grouping device 110 groups the network configuration information according to a grouping rule pre-stored.

It should be illustrated that, the grouping rule is pre-calibrated between the mobile terminal and the household appliance.

For example, the grouping rule pre-calibrated between the mobile terminal and the household appliance is to take four bytes as a group. When it is monitored that an interface indicating to send the SSID and the password for accessing the network is opened during the user using the mobile phone, a name of a current network the mobile terminal has accessed is added automatically to the interface. When it is monitored that the interface receives the password for accessing the network input by the user and an option to send is triggered by the user, the grouping device 110 groups the name of the current network according to the grouping rule. It is assumed that the name of the current network is "abcdefgh", then the name of the current network can be grouped into two groups, with "abcd" as a content of a first group and "efgh" as a content of a second group.

The generating device 120 is configured to generate a data block for each group.

The data block for each group includes a first data packet corresponding to a character for each information bit in the current group and a second data packet corresponding to a series number for the current group. A length of the first data packet corresponds to the character for each information bit in the current group, and a length of the second data packet corresponds to the series number for the current group.

The information bit is an information bit of a network identifier SSID or an information bit of the password for accessing the network.

In detail, after the grouping device 110 groups the network configuration information, for each group, the generating device 120 may determine the length of the first data packet corresponding to the character for each information bit in the current group according to a pre-stored correspondence between a length and a character; generate the first data packet with the length determined; assign a unique series number to the current group and generate the second data packet with the length corresponding to the series number; and generate the data block for the current group according to the first data packet corresponding to the character for each information bit in the current group and the second data packet corresponding to the series number for the current group.

In order to enable the household appliance to distinguish the network identifier SSID from the password for accessing the network, a pre-arrangement can be made between the mobile terminal and the household appliance that a grouping series number of the data block containing the network identifier SSID is in a different range interval as compared with a grouping series number of the data block containing the password for accessing the network.

For example, it can be pre-arranged between the mobile terminal and the household appliance that, a range interval of the grouping series number of the data block containing the network identifier SSID is from 1 to 20, and a range interval of the grouping series number of the data block containing the password for accessing the network is from 21 to 40. It is assumed that a grouping rule is to take 4 bytes as a group, the network identifier SSID is "abcdefghij", and the password for accessing the network is "abcd1234", the network identifier SSID is grouped into three groups, in which the content of the first group is "abcd" and the series number for the first group is 1; the content of the second group is "efgh" and the series number for the second group is 2; and the content of the third group is "ij" and the series number for the third group is 3; while the password for accessing the network can be grouped into two groups, in which the content of the first group is "abcd" and the series number for the first group is 21, and the content of the second group is "1234" and the series number for the second group is 22, such that the household appliance can distinguish, by parsing a sequence of data packets received, the type of each data block, the network identifier SSID or the password for accessing the network, after receiving the sequence of data packets.

In order to distinguish whether the data block transmits the network identifier SSID or the password for accessing the network, an additional data packet may be added to the data block for each group, indicating whether the data block of the current group is the network identifier SSID or the password for accessing the network.

For example, it may be pre-arranged between the mobile terminal and the household appliance that 0 corresponds to the network identifier SSID, and 1 corresponds to the password for accessing the network. It is assumed that the network identifier SSID is grouped into two groups, and the password for accessing the network is grouped into three groups, then a data packet with a length of 0 is added to each of the data blocks of the first group and the second group when generated, and a data packet with a length of 1 is added for each of the data blocks of the third group, the fourth group and the fifth group when generated, such that after the mobile terminal sends the data packets in order in each data block to the household appliance, the household appliance can distinguish, by parsing a sequence of data packets received, that five data blocks are transmitted, with the contents in the data blocks of the first group and the second group corresponding to the network identifier SSID and the contents in the data blocks of the third group, the fourth group and the fifth group corresponding to the password for accessing the network, thereby generating the network identifier SSID according to stitching algorithm with the contents in the data blocks of the first group and the second group, generating the password for accessing the network according to stitching algorithm with the contents in the data blocks of the third group, the fourth group and the fifth group, and thus accessing the network according to the network identifier SSID and the password for accessing the network obtained.

The data block may consist of a preamble field, a length field, a grouping number field, a content field, and a verification field. It should be understood that, a format of the data block of each group may be illustrated as Table 1.

The preamble field is configured to store specific information. The specific information is pre-arranged between the mobile terminal and the household appliance, so that the household appliance locks onto a communication channel through the specific information.

Generally, the mobile terminal, such as a mobile phone, communicates a router device communicate via a certain channel. However, the household appliance does not know the communication channel between the mobile terminal and the router device. As a result, the household appliance will poll each channel to find a synchronization header (i.e. the preamble field) pre-arranged with the mobile terminal, so as to lock onto the channel and thus receive the data packets broadcasted by the mobile terminal via the channel.

Further, each the data block of each group includes the preamble field. The household appliance may distinguish different data blocks according to the preamble field. That is to say, the preamble field is a starting flag for each data block of each group.

The length field in Table 1 is configured to store the length of the network identifier SSID or the length of the password for accessing the network.

For example, if the length of the network identifier SSID is 8 bytes, then the content of the length field is 8.

The grouping series number field is configured to store the series number for each group.

The content field is configured to store the characters for each information bit in each group.

The verification field is configured to store a verification value. The verification value is generated according to a content of the length field, a content of the grouping series number field and a content of the content field.

In detail, after the network configuration information is acquired, the length of the network configuration information can be determined. It should be understood that, when the network configuration information includes both the network identifier SSID and the password for accessing the network, the length of the network identifier SSID and the length of the password for accessing the network can be determined respectively.

It should be illustrated that, the data block is in a format pre-arranged between the mobile terminal and the household appliance.

In detail, the generating device 120 is configured to generate a data packet corresponding to the specific information; to generate a data packet corresponding to the length of the network configuration information; to generate a verification value of the current group according to the character for each information bit in the current group, the length of the network configuration information and the series number for the current group; to generate a data packet corresponding to the verification value; and to generate the data block of the current group according to the data packet corresponding to the specific information, the data packet corresponding to the length of the network configuration information, the data packet corresponding to the series number, the data packet corresponding to the character for each information bit in the current group and the data packet corresponding to the verification value.

The broadcasting device 130 is configured to broadcast the data packets in order in each data block according to a grouping order, so that the household appliance acquires the network configuration information according to the data packets received and accesses the network according to the network configuration information.

Figure 7:
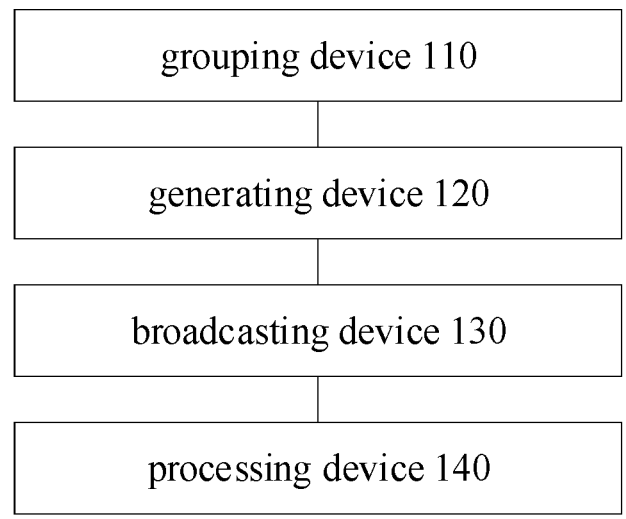
FIG. 7 is a block diagram of a device for controlling a household appliance to access a network according to another embodiment of the present disclosure.

On the basis of the embodiment as shown in FIG. 6, as illustrated in FIG. 7, the device for controlling the household appliance to access the network further includes a processing device 140.

The processing device 140 is configured to receive a confirmation instruction sent by the household appliance and to stop sending the data packets to the household appliance according to the confirmation instruction.

It should be illustrated that, the above explanations and descriptions to the method for controlling the household appliance to access the network are also suitable for the device for controlling a household appliance to access the network in the embodiments described here, which are not elaborated.

With the device for controlling the household appliance to access the network according to embodiments of the present disclosure, the grouping device groups the network configuration information according to the grouping rule; the generating device generates the data block for each group; the broadcasting device broadcasts the data packets in order in each data block according to the grouping order, so that the household appliance acquires the network configuration information according to the data packets received and accesses the network through the network configuration information. Therefore, the network configuration information is sent to the household appliance in the grouping manner, such that efficiency of the household appliance acquiring the network configuration information accurately can be improved, thereby improving efficiency of the household appliance accessing the network.

Figure 8:
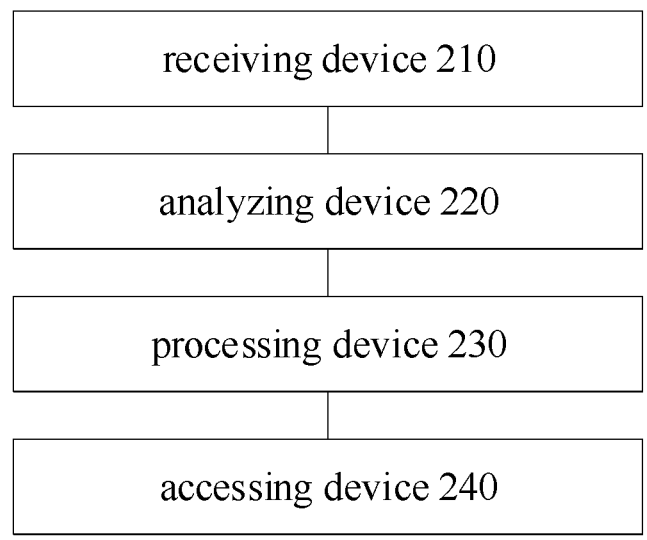
FIG. 8 is a block diagram of a device for controlling a household appliance to access a network according to still another embodiment of the present disclosure.

FIG. 8 is a block diagram of a device for controlling a household appliance to access a network according to another embodiment of the present disclosure. The device for controlling the household appliance to access the network is provided in the household appliance. As illustrated in FIG. 8, the device includes a receiving device 210, an analyzing device 220, a processing device 230 and an accessing device 240.

The receiving device 210 is configured to receive a sequence of data packets sent by a mobile terminal.

The analyzing device 220 is configured to analyze the sequence of data packets received to determine each data block according to the sequence of data packets when it is determined that the sequence of data packets includes network configuration information.

Each of the data blocks includes a part content of the network configuration information, and each of the data blocks has an individual series number.

The network configuration information includes a password for accessing the network, and a network identifier SSID. The network identifier SSID is for example a name of the network.

The analyzing device 220 is specifically configured to judge whether the sequence of data packets includes data packets satisfying a preset condition. If the sequence of data packets includes the data packets satisfying the preset condition, the analyzing device 220 is configured to determine that the sequence of data packets received includes the network configuration information.

The preset condition is pre-set by the household appliance.

For example, the preset condition is that if a difference between lengths of each two adjacent data packets in the first four data packets received is 1, it can be determined that the sequence of data packets sent by the mobile terminal includes the network configuration information. As such, the household appliance locks onto the communication channel and continuously receives the data packet sent by the mobile terminal subsequently It should be understood that, the format of the data block arranged between the household appliance and the data block is illustrated as Table 1. It may also be understood that Table 1 is a protocol used in transmission between the household appliance and the mobile terminal. For those fields included in Table 1, descriptions may be referred to above embodiments, which are not elaborated herein.

The processing device 230 is configured to receive the sequence of data packets sent by the mobile terminal continuously when it is monitored that there is an incorrect data block having an incorrect content in the sequence of the data packets received, and to generate the network configuration information according to an order of the series numbers and contents of correct data blocks when it is determined that all of the data blocks are the correct data blocks each having a correct content according to received results.

The accessing device 240 is configured to access a router device based on the network configuration information.

Figure 9:
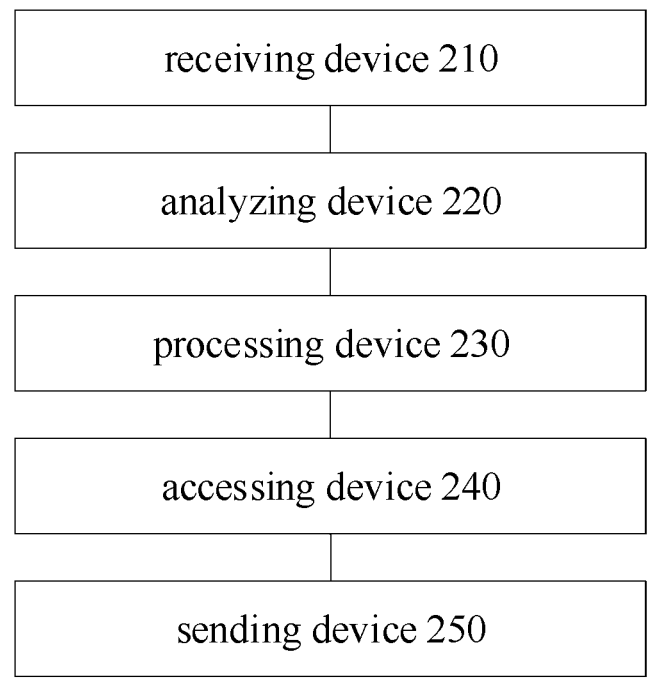
FIG. 9 is a block diagram of a device for controlling a household appliance to access a network according to yet another embodiment of the present disclosure.

On the basis of the embodiment of FIG. 8, as illustrated in FIG. 9, the device for controlling the household appliance to access the network further includes a sending device 250. The sending device 250 is configured, when it is determined that all of the data blocks are correct and each data block has a correct content according to received results, to send a confirmation instruction to the mobile terminal, so that the mobile terminal stops sending data packets to the household appliance according to the confirmation instruction.

It should be illustrated that, the above explanations and descriptions to the method for controlling the household appliance to access the network are also suitable for the device for controlling a household appliance to access the network in the embodiments described here, which are not elaborated.

With the device for controlling the household appliance to access the network according to embodiments of the present disclosure, the receiving device receives the sequence of data packets sent by the mobile terminal; the analyzing device analyzes the sequence of data packets received to determine each data block according to the sequence of data packets received when it is determined that the sequence of data packets received includes the network configuration information; and the processing device receives the sequence of data packets sent by the mobile terminal continuously when it is monitored that there is an incorrect data block having an incorrect content in the sequence of the data packets received, and generates the network configuration information according to the order of the series numbers and the contents of the correct data packets when it is determined that all data blocks are the correct data blocks each having a correct content according to the received results, such that efficiency of the household appliance acquiring the network configuration information accurately can be improved, thereby improving efficiency of the household appliance accessing the network.

In the description of the present disclosure, it is to be understood that, terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, a term "a plurality of" means at least two, such as two, three or the like, unless specified otherwise.

In the description of the present disclosure, reference throughout this specification to "an embodiment", "some embodiments", "an example", "a specific example" or "some examples" means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

What is claimed is:

1. A method for controlling access to a network by a household appliance, comprising:
    grouping network configuration information into a plurality of groups according to a grouping rule;
    generating a data block for each of the plurality of groups, wherein the data block for each of the plurality of groups comprises a first data packet corresponding to a character for each information bit in a current group and a second data packet corresponding to a series number for the current group, a length of the first data packet corresponds to the character for each information bit in the current group, and a length of the second data packet corresponds to the series number for the current group; and
    broadcasting data packets in order in each data block according to a grouping order, wherein the household appliance acquires the network configuration information according to the data packets received and accesses the network through the network configuration information.

2. The method according to claim 1, wherein the information bit is an information bit of a network identifier SSID or an information bit of a password for accessing the network.

3. The method according to claim 1, wherein generating a data block for each group comprises:
    determining the length of the first data packet corresponding to the character for each information bit in the current group according to a pre-stored correspondence between a length and a character, and generating the first data packet with the length determined;
    assigning a unique series number to the current group and generating the second data packet with the length corresponding to the series number; and
    generating the data block for the current group according to the first data packet corresponding to the character and the second data packet corresponding to the series number.

4. The method according to claim 1, wherein the data block for each group consists of a preamble field, a length field, a grouping series number field, a content field and a verification field, wherein the preamble field is configured to store specific information, wherein the specific information is pre-arranged between a mobile terminal and the household appliance such that the household appliance locks onto a communication channel through the specific information; the length field is configured to store a length of a network identifier SSID or a length of a password for accessing the network; the grouping series number field is configured to store a grouping series number; the content field is configured to store the character for each information bit in each group; and the verification field is configured to store a verification value, wherein the verification value is generated according to a content of the length field, a content of the grouping series number field and a content of the content field.

5. The method according to claim 4, further comprising:
    determining a length of the network configuration information,
    wherein generating a data block for each group comprises:
    generating a data packet corresponding to the specific information;
    generating a data packet corresponding to the length of the network configuration information;
    generating a verification value of the current group according to the character for each information bit in the current group, the length of the network configuration information and the series number for the current group, and generating a data packet corresponding to the verification value; and
    generating the data block for the current group according to the data packet corresponding to the specific information, the data packet corresponding to the length of the network configuration information, the data packet corresponding to the series number, the data packet corresponding to the character for each information bit in the current group and the data packet corresponding to the verification value.

6. The method according to claim 4, wherein the data block further comprises a data packet indicating whether the current group is the network identifier SSID or the password for accessing the network.

7. The method according to claim 1, further comprising:
    receiving a confirmation instruction sent by the household appliance, and stopping sending data packets to the household appliance according to the confirmation instruction.

8. A method for controlling access to a network by a household appliance, comprising:
    receiving a sequence of data packets sent by a mobile terminal;
    analyzing the sequence of data packets received to determine each data block according to the sequence of data packets received when determining that the sequence of data packets received comprises network configuration information, wherein each of the data blocks comprises a part content of the network configuration information, and each of the data blocks has an individual series number;
    receiving the sequence of data packets sent by the mobile terminal continuously when monitoring that there is an incorrect data block having an incorrect content in the sequence of data packets received, and generating the network configuration information according to an order of the series numbers and contents of correct data blocks when determining that all of the data blocks are the correct data blocks each having a correct content according to a plurality of received results; and accessing a router device based on the network configuration information.

9. The method according to claim 8, wherein determining that the sequence of data packets received comprises network configuration information comprises:

judging whether the sequence of data packets received comprises data packets satisfying a preset condition; if yes, determining that the sequence of data packets received comprises the network configuration information.

10. The method according to claim 8, wherein when determining that all of the data blocks are correct and each data block has a correct content according to a plurality of received results, the method further comprises:

sending a confirmation instruction to the mobile terminal, so that the mobile terminal stops sending data packets to the household appliance according to the confirmation instruction.

* * * * *